United States Patent
Asano et al.

(10) Patent No.: US 8,781,291 B2
(45) Date of Patent: Jul. 15, 2014

(54) DATA PROCESSING DEVICE, DATA PROCESSING METHOD, AND PROGRAM

(75) Inventors: Yasuharu Asano, Kanagawa (JP); Kenichiro Kobayashi, Kanagawa (JP); Noriyuki Yamamoto, Kanagawa (JP)

(73) Assignee: Sony Corporation, Tokyo (JP)

(*) Notice: Subject to any disclaimer, the term of this patent is extended or adjusted under 35 U.S.C. 154(b) by 332 days.

(21) Appl. No.: 12/623,525

(22) Filed: Nov. 23, 2009

(65) Prior Publication Data

US 2010/0142925 A1    Jun. 10, 2010

(30) Foreign Application Priority Data

Dec. 4, 2008 (JP) ................ P2008-309578

(51) Int. Cl.
*H04N 5/931* (2006.01)

(52) U.S. Cl.
USPC ........................................ 386/212; 386/213

(58) Field of Classification Search
USPC ................................................ 386/212, 213
See application file for complete search history.

(56) References Cited

U.S. PATENT DOCUMENTS

| | | | |
|---|---|---|---|
| 2005/0102280 A1* | 5/2005 | Tanaka et al. | 707/3 |
| 2005/0191035 A1* | 9/2005 | Jung et al. | 386/95 |
| 2007/0157265 A1* | 7/2007 | Maekawa | 725/88 |
| 2009/0073314 A1* | 3/2009 | Uemukai et al. | 348/468 |
| 2009/0303383 A1* | 12/2009 | Hamada et al. | 348/468 |

FOREIGN PATENT DOCUMENTS

| | | |
|---|---|---|
| JP | 2005-045503 | 2/2005 |
| JP | 2005-286969 | 10/2005 |
| JP | 2006-211636 | 8/2006 |
| JP | 2008-148175 | 6/2008 |

OTHER PUBLICATIONS

Official communication issued by Japan Patent Office, dated Dec. 4, 2012 for counterpart Japan Patent Application No. 2008-309578 (3 pages).

* cited by examiner

*Primary Examiner* — Thai Tran
*Assistant Examiner* — Jose Mesa
(74) *Attorney, Agent, or Firm* — Finnegan Henderson Farabow Garrett & Dunner LLP

(57) ABSTRACT

A data processing device including an output control unit configured to extract a character string targeted for a search from subtitle data of content data including image data, voice data, and the subtitle data, search the voice data for data of a voice uttering the character string, acquire timing information indicating time when the character string is uttered, which is included in the image data, generate subtitle timing information including identification information provided to identify the subtitle data including the character string and the timing information, where the identification information and the timing information are associated with each other, so that the subtitle timing information is acquired, and synchronize the subtitle data and image data of time indicated by timing information associated with identification information of the subtitle data, and output the subtitle data and the image data based on the subtitle timing information is provided.

12 Claims, 5 Drawing Sheets

DATA PROCESSING DEVICE, DATA PROCESSING METHOD, AND PROGRAM

BACKGROUND OF THE INVENTION

1. Field of the Invention

The present invention relates to a data processing device, a data processing method, and a program, and particularly relates to a data processing device, a data processing method, and a program that are provided to, for example, synchronize and display the images and subtitles of contents of a television broadcast program or the like with facility.

2. Description of the Related Art

For example, in a television broadcast, subtitle data is included in a television broadcast signal in the form of closed captioning or the like so that an audibly challenged audience can understand the details of an image of a program provided as contents.

In a television (TV) receiver receiving the television broadcast signal and/or a reception device including a recorder or the like, the subtitle data is superimposed on the image data of a program so that the program image and subtitles are displayed. Usually, the subtitles may be hidden (closed).

Incidentally, in television broadcasts provided at the present time, subtitles are not necessarily displayed in synchronization with an image. That is to say, the subtitles are often displayed out of synchronization with the image corresponding to the subtitles (an image of which details are described through the subtitles).

Particularly, in a live broadcast, for example, an operator produces characters shown as subtitles on a keyboard on the spot, so that the subtitles corresponding to an image often lag behind the image display by several to a few tens of seconds. In that case, the image details do not match (agree) with the details of descriptions provided through subtitles superimposed on the image. Consequently, the audience is often confused and annoyed.

For correcting the above-described delay of displayed subtitles, the method of calculating the delay time of subtitle data shown for image data through a television broadcast station and transmitting data of the delay time to a reception device had been introduced, as disclosed in Japanese Unexamined Patent Application Publication No. 2006-211636. In that case, the reception device displays subtitles in synchronization with an image based on the delay time data transmitted from the broadcast station.

SUMMARY OF THE INVENTION

For transmitting delay time data from a broadcast station to a reception device in the above-described manner, a broadcast standard should be settled (modified) with reference to the delay time data transmission, and both the broadcast station and the reception device should be ready for the broadcast standard.

However, a complicated procedure should be performed to settle the broadcast standard. Further, it is also complicated and difficult for both the broadcast station and the reception device to be ready for the broadcast standard.

Accordingly, an embodiment of the present invention has been made to synchronize and display the image and subtitles of contents with facility. Namely, an embodiment of the present invention allows for synchronizing and displaying the image and subtitles of contents without modifying the broadcast standard or making the broadcast station be ready for the broadcast standard.

According to an embodiment of the present invention, a data processing device and/or a program making a computer function as the data processing device is provided, where the data processing device includes an output control unit configured to extract a character string targeted for a search from subtitle data of content data including image data, voice data, and the subtitle data, search the voice data for data of a voice uttering the character string, acquire timing information indicating time when the character string is uttered, the timing information being included in the image data, generate subtitle timing information including identification information provided to identify the subtitle data including the character string and the timing information, where the identification information and the timing information are associated with each other, so that the subtitle timing information is acquired, and synchronize the subtitle data and image data of time indicated by timing information associated with identification information of the subtitle data, and output the subtitle data and the image data based on the subtitle timing information.

A data processing method according to an embodiment of the present invention includes the steps of extracting a character string targeted for a search from subtitle data of content data including image data, voice data, and the subtitle data, searching the voice data for data of a voice uttering the character string, acquiring timing information indicating time when the character string is uttered, the timing information being included in the image data, generating subtitle timing information including identification information provided to identify the subtitle data including the character string and the timing information, where the identification information and the timing information are associated with each other, so that the subtitle timing information is acquired, and synchronizing the subtitle data and image data of time indicated by timing information associated with identification information of the subtitle data, and outputting the subtitle data and the image data based on the subtitle timing information through a data processing device.

According to the above-described embodiment, a character string targeted for a search is extracted from subtitle data of content data including image data, voice data, and the subtitle data, the voice data is searched for data of a voice uttering the character string, timing information indicating time when the character string is uttered, the timing information being included in the image data is acquired, subtitle timing information including identification information provided to identify the subtitle data including the character string and the timing information is generated, where the identification information and the timing information are associated with each other, so that the subtitle timing information is acquired, and the subtitle data and image data of time indicated by timing information associated with identification information of the subtitle data are synchronized and output based on the subtitle timing information.

Here, the data processing device may be provided as a standalone device and/or at least one internal block included in a single device.

Further, the program may be transferred via a transfer medium and/or recorded on a recording medium so as to be presented to a user.

According to an embodiment of the present invention, the image and subtitles of contents can be synchronized and displayed with facility.

DESCRIPTION OF THE PREFERRED EMBODIMENTS

Figure 1:
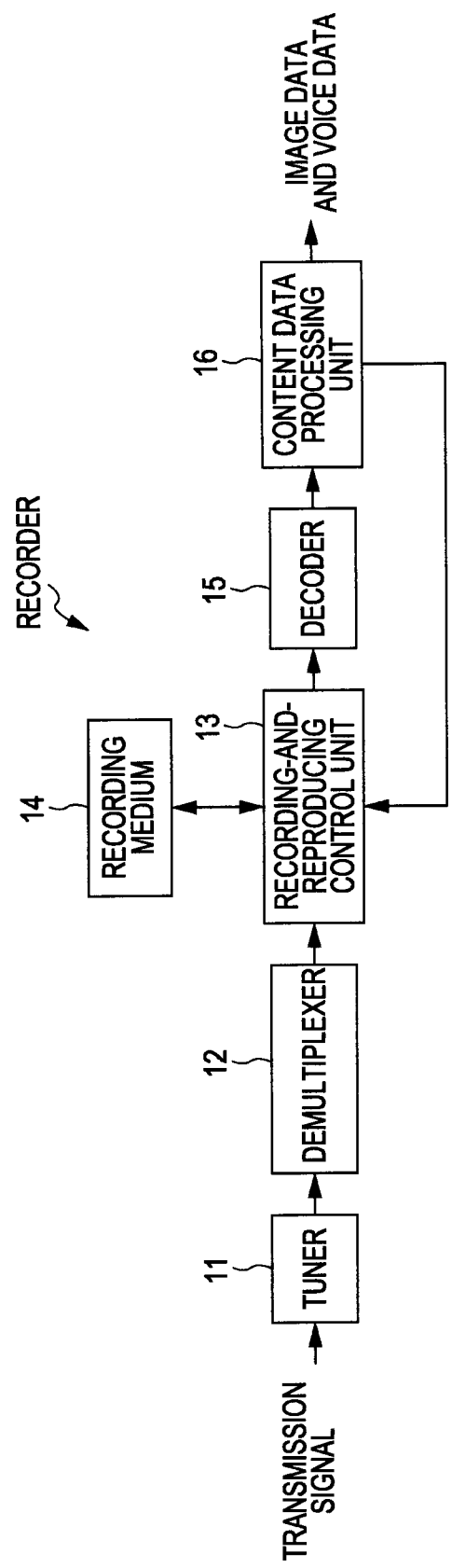
FIG. 1 is a block diagram showing an exemplary configuration of a recorder according to an embodiment of the present invention.

An Exemplary Configuration of a Recorder According to an Embodiment of the Present Invention FIG. 1 is a block diagram showing an exemplary configuration of a recorder according to an embodiment of the present invention.

A recorder shown in FIG. 1 is, for example, a hard disk (HD) recorder including a tuner 11, a demultiplexer 12, a recording-and-reproducing control unit 13, a recording medium 14, a decoder 15, a content data processing unit 16, and so forth.

The tuner 11 receives and demodulates a transmission signal of a television broadcast program, the transmission signal being transmitted from a digital broadcast station (not shown), for example. Consequently, the tuner 11 acquires, for example, a transport stream (TS) including content data and transmits the TS to the demultiplexer 12.

Here, the recorder shown in FIG. 1 can acquire not only the content data (the TS including the content data) from the transmission signal of the digital broadcast in the above-described manner, but also content data from a network including a local area network (LAN), the Internet, and so forth.

The demultiplexer 12 extracts appropriate data used to perform control (program specific information (PSI) and/or service information (SI)), the data including electronic program guide (EPG) data, from the TS transmitted from the tuner 11, and transmits the appropriate control data to the recording-and-reproducing control unit 13.

Further, the demultiplexer 12 extracts a TS packet including content data of a predetermined program from the TS transmitted from the tuner 11 based on an operation or the like performed by a user (audience), and transmits the TS packet to the recording-and-reproducing control unit 13.

The recording-and-reproducing control unit 13 controls recording and/or reproducing (reading) data on and/or from the recording medium 14.

That is to say, the recording-and-reproducing unit 13 records the EPG data, the content data (the TS packet including the content data), and so forth that are transmitted from the demultiplexer 12 on the recording medium 14. Further, the recording-and-reproducing control unit 13 reproduces (reads) the content data or the like from the recording medium 14 and transmits the content data or the like to the decoder 15 based on the operation performed by the user, a request transmitted from the content data processing unit 16, and so forth.

The recording medium 14 includes a magnetic disk including a hard disk (HD) or the like, an optical disk including a digital versatile disk (DVD), a Blu-ray disk, and so forth, a semiconductor memory including a flash memory or the like, etc., and records (stores) data under the control of the recording-and-reproducing control unit 13.

The decoder 15 decodes the TS packet including the content data, the TS packet being transmitted from the recording-and-reproducing control unit 14, by the moving picture experts group (MPEG) standard, for example, and transmits content data obtained as the decoding result to the content data processing unit 16, the content data including image data, voice data, and subtitle data obtained through closed captioning or the like.

The content data processing unit 16 transmits data of a request for appropriate content data to the recording-and-reproducing control unit 13. Further, the content data processing unit 16 processes the image data, the voice data, and the subtitle data that are included in the content data transmitted from the decoder 15, and outputs composite image data obtained by superimposing the subtitle data on the corresponding image data (composition) and voice data coming with the composite image data.

In the above-described recorder, the tuner 11 receives and demodulates the transmission signal so that the TS is acquired, and transmits the TS to the demultiplexer 12.

The demultiplexer 12 extracts a TS packet including content data of a predetermined program from the TS transmitted from the tuner 11, and transmits the TS packet to the recording-and-reproducing control unit 13.

The recording-and-reproducing control unit 13 records the TS packet including the content data, the TS packet being transmitted from the demultiplexer 12, on the recording medium 14. Consequently, so-called program recording is performed.

When reproducing the program recorded in the above-described manner, the recording-and-reproducing unit 13 reproduces (reads) the TS packet including the TS packet from the recording medium 14, and transmits the TS packet to the decoder 15.

The decoder 15 decodes the TS packet including the content data, the TS packet being transmitted from the recording-and-reproducing control unit 14, so that content data including image data, voice data, and subtitle data is obtained, and transmits the content data to the content data processing unit 16.

The content data processing unit 16 processes the image data, the voice data, and the subtitle data that are included in the content data transmitted from the decoder 15, and outputs composite image data obtained by superimposing the subtitle data on the corresponding image data and voice data coming with the composite image data.

The composite image data and the voice data that are output from the content data processing unit 16 are transmitted to a monitor (not shown). The monitor displays the composite image corresponding to the composite image data, that is, an image obtained by superimposing subtitle data on an image of the program, the subtitle data describing the details of the program image. At the same time, the monitor outputs the voice corresponding to the voice data.

Here, the subtitle display (the subtitle superimposition) can be turned on and/or off based on, for example, an operation performed by the user.

[Exemplary Configuration of Content Data Processing Unit 16]

Figure 2:
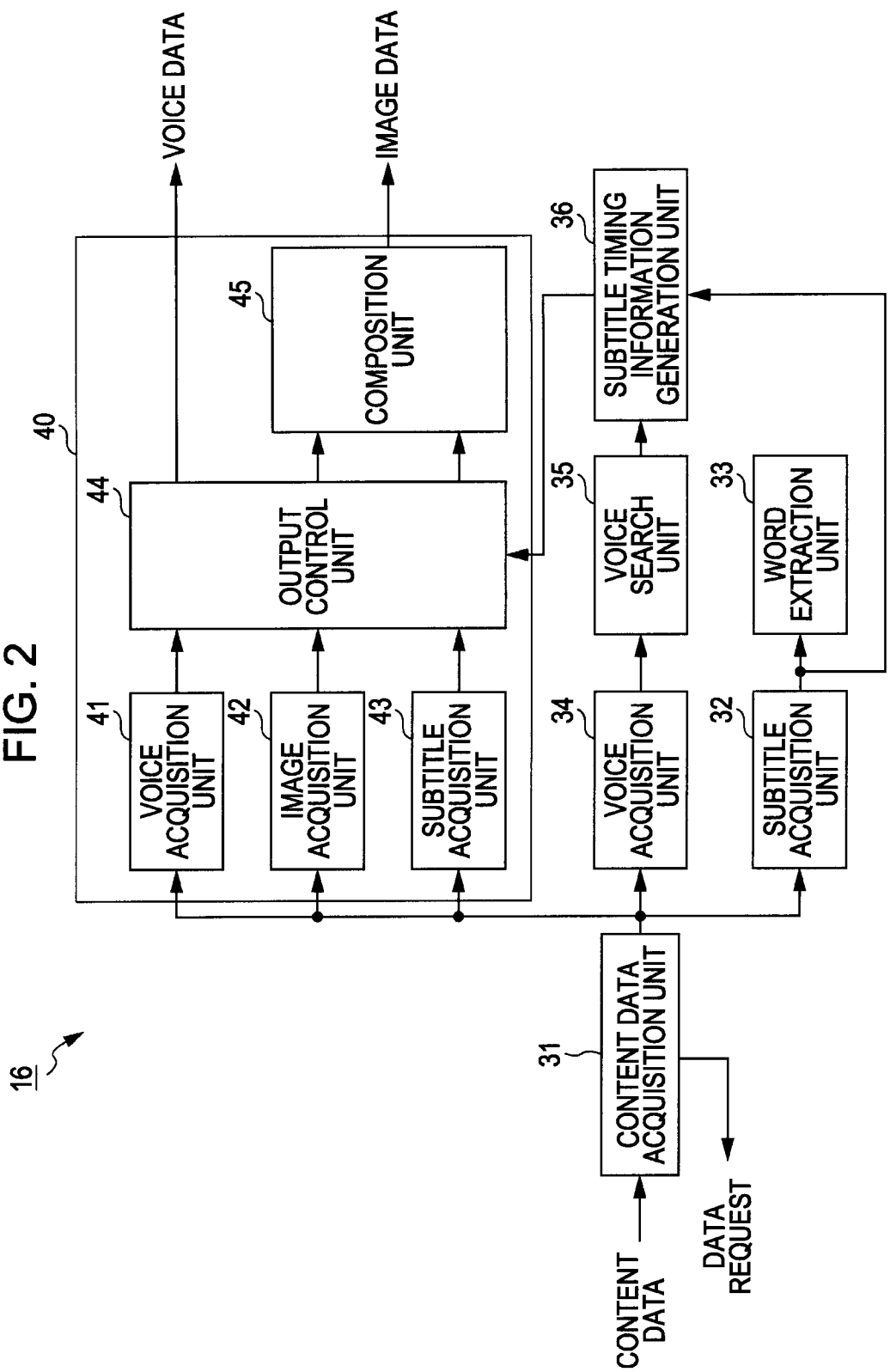
FIG. 2 is a block diagram showing an exemplary configuration of a content data processing unit.

FIG. 2 shows an exemplary configuration of the content data processing unit 16 shown in FIG. 1.

In FIG. 2, the content data processing unit 16 is a data processing device configured to process the content data including the image data, the voice data, and the subtitle data, the content data being transmitted from the decoder 15 (shown in FIG. 1). The content data processing unit 16 includes a content data acquisition unit 31, a subtitle acquisition unit 32, a word extraction unit 33, a voice acquisition unit 34, a voice search unit 35, a subtitle timing information generation unit 36, a synchronization unit 40, and so forth.

The content data acquisition unit 31 transmits a request for the content data to the recording-and-reproducing control unit 13 (shown in FIG. 1), and the recording-and-reproducing control unit 13 acquires the content data reproduced from the recording medium 14 and transmitted to the content data acquisition unit 31 via the decoder 15 in response to the request.

Further, the content data acquisition unit 31 acquires the content data that is reproduced from the recording medium 14 and that is transmitted to the content data acquisition unit 31 via the decoder 15 through the recording-and-reproducing control unit 13, based on, for example, an operation performed by the user.

The content data acquisition unit 31 transmits the content data acquired in the above-described manner to the subtitle acquisition unit 32, the voice acquisition unit 34, and the synchronization unit 40 as appropriate.

The subtitle acquisition unit 32 acquires (separates) subtitle data from the content data transmitted from the content data acquisition unit 31 in, for example, groups of subtitle data, and transmits the acquired subtitle data to the word extraction unit 33 and the subtitle timing information generation unit 36.

The word extraction unit 33 extracts, for example, data of at least one word (string) provided as data of a character string targeted for a search from, for example, text data provided as the subtitle data transmitted from the subtitle acquisition unit 32 through natural language processing technologies including morphological analysis or the like, and transmits the word data to the voice search unit 35.

Here, the word extracted from the subtitle data as the character string targeted for the search through the word extraction unit 33 is also referred to as a search target word.

Further, in addition to extracting the search target word from the subtitle data, the word extraction unit 33 acquires display time information indicating the display time when the subtitle corresponding to subtitle data including the search target word is displayed as appropriate, and transmits the acquired display time information and the search target word to the voice search unit 35.

That is to say, the content data transmitted from the content data acquisition unit 31 to the subtitle acquisition unit 32 includes, for example, information about the time when the subtitle data is displayed. The subtitle data acquisition unit 32 acquires the display time information from the content data transmitted from the content data acquisition unit 31 in addition to the subtitle data, and transmits the subtitle data and the display time information to the word extraction unit 33.

Upon receiving the display time information transmitted from the subtitle acquisition unit 32, the word extraction unit 33 transmits the search target word extracted from the subtitle data and information about the time when the subtitle data including the search target word is displayed to the voice search unit 35.

The voice acquisition unit 34 acquires the voice data from the content data transmitted from the content data acquisition unit 31, and transmits the voice data to the voice search unit 35.

The voice search unit 35 searches the voice data transmitted from the voice acquisition unit 34 for data of a voice uttering the search target word of which data is transmitted from the word extraction unit 33, and acquires timing information indicating the time when the search target word is uttered in image data with which the voice data comes.

Here, the timing information may be a time code or the like indicating relative time determined with reference to the head time of a program provided as the contents corresponding to the content data acquired through the content data acquisition unit 31, for example.

Further, upon receiving the display time information transmitted from the word extraction unit 33, the voice search unit 35 can search the voice data for the data of the voice uttering the search target word within the confines of voice data near the display time indicated by the display time information.

Since the voice search unit 35 searches the voice data for the data of the voice uttering the search target word within the confines of the voice data near the display time indicated by the display time information instead of searching the entire segment of the voice data included in the content data acquired through the content data acquisition unit 31, it becomes possible to increase the precision of the voice data search, decrease the amount of processing performed to attain the search, and perform the search processing with high speed, for example.

The subtitle timing information generation unit 36 generates subtitle timing information including subtitle identification information used to identify the subtitle data transmitted from the subtitle acquisition unit 32 and the timing information indicating the time when the search target word is uttered, the timing information being acquired through the voice search unit 35 searching for the data of the voice uttering the search target word extracted from the subtitle data, where the subtitle identification information and the timing information are associated with each other.

Further, the subtitle timing information generation unit 36 stores content identification information provided to identify the content data acquired through the content data acquisition unit 31 in association with the subtitle timing information generated from the content data.

The subtitle timing information stored in the subtitle timing information generation unit 36 is referred to by an output control unit 44 of the synchronization unit 40 as appropriate.

Further, the subtitle identification information provided to identify the subtitle data may be, for example, the subtitle data itself. Still further, the content identification information provided to identify the content data may be, for example, data of the title of a program which is the contents corresponding to the above-described content data and/or data of the broadcast date and time, the broadcast channel, and so forth.

In addition, data of a unique identification (ID) may be given to the content data and the ID data can be used as the content identification information. The same may be said of the subtitle identification information. However, the subtitle identification information should be information acquired from the subtitle data itself, such as a hash value obtained by determining the subtitle data to be an argument.

The synchronization unit 40 performs processing for the content data transmitted from the content data acquisition unit 31 so that the image data included in the content data and the subtitle data corresponding to the image data are displayed in synchronization with each other. Consequently, the synchronization unit 40 obtains composite image data achieved by superimposing the subtitle data on the corresponding image data, and outputs the composite image data and voice data coming with the composite image data.

That is to say, the synchronization unit 40 includes a voice acquisition unit 41, an image acquisition unit 42, a subtitle acquisition unit 43, the output control unit 44, a composition unit 45, and so forth.

The content data acquisition unit 31 transmits the content data to the voice acquisition unit 41, the image acquisition unit 42, and the subtitle acquisition unit 43.

The voice acquisition unit 41 acquires the voice data from the transmitted content data and transmits the voice data to the output control unit 44.

The image acquisition unit 42 acquires the image data from the transmitted content data and transmits the image data to the output control unit 44.

The subtitle acquisition unit 43 acquires the subtitle data from the transmitted content data and transmits the subtitle data to the output control unit 44.

The output control unit 44 synchronizes the subtitle data transmitted from the subtitle data acquisition unit 43 and image data of the time indicated by the timing information associated with the subtitle identification information of the subtitle data based on the subtitle timing information stored in the subtitle timing information generation unit 36, and outputs the subtitle data, the image data, and voice data coming with the image data.

That is to say, the output control unit 44 stores the image data transmitted from the image acquisition unit 42 and the voice data coming with the image data, the voice data being transmitted from the voice acquisition unit 41, as appropriate so that the image data and the voice data are delayed by as much as a predetermined time and output.

Further, the output control unit 44 refers to each of subtitle timing information items that are associated with the content identification information of the content data acquired through the content data acquisition unit 31 of the subtitle timing information stored in the subtitle timing information generation unit 36, as remarked subtitle timing information to be remarked.

Further, the output control unit 44 detects timing information from the remarked subtitle timing information, the timing information being associated with the subtitle identification information of the subtitle data transmitted from the subtitle acquisition unit 43, and outputs the subtitle data transmitted from the subtitle acquisition unit 43 in synchronization with image data of the time indicated by the timing information, that is, image data of which details are described by the subtitles corresponding to the subtitle data transmitted from the subtitle acquisition unit 43.

Here, the voice data output from the output control unit 44 is transmitted to a monitor (not shown).

Further, the image data output from the output control unit 44 and data of subtitles describing the details of the image data are transmitted to the composition unit 45.

The composition unit 45 superimposes the subtitle data transmitted from the output control unit 44 on the image data which is also transmitted from the output control unit 44 (composition) so that the composite image data is generated and output.

The composite image data output from the composition unit 45 is transmitted to the monitor (not shown) in addition to voice data coming with the composite image data, the voice data being output from the output control unit 44.

The above-described content data processing unit 16 performs subtitle timing information acquisition processing and synchronization-and-reproducing processing.

During the subtitle timing information acquisition processing, the subtitle timing information is generated based on the content data (a TS packet including the content data) recorded on the recording medium 14, for example, so that the subtitle timing information is acquired. Further, during the synchronization-and-reproducing processing, the image data and the subtitle data that are included in the content data are synchronized based on the subtitle timing information acquired through the subtitle timing information acquisition processing, and the image data, the subtitle data, and voice data coming with the image data are output.

[Description of Subtitle Timing Information Acquisition Processing]

Figure 3:
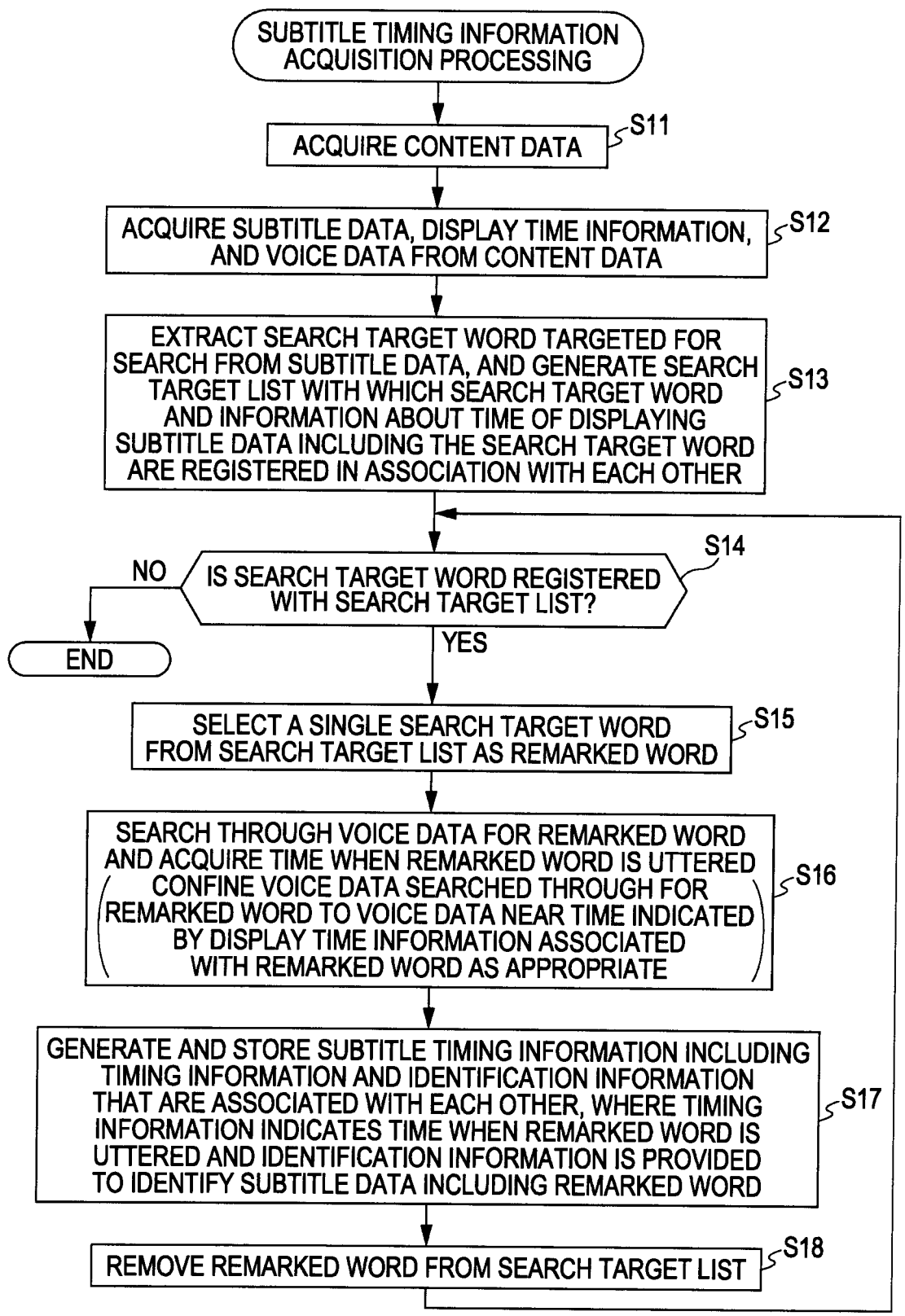
FIG. 3 is a flowchart illustrating subtitle timing information acquisition processing.

The subtitle timing information acquisition processing performed through the content data processing unit 16 shown in FIG. 2 will be described with reference to FIG. 3.

The subtitle timing information acquisition processing may be started at arbitrary time such as periodic time and/or aperiodic time.

At step S11 of the subtitle timing information acquisition processing, the content data acquisition unit 31 acquires one of content data items that are recorded on the recording medium 14 (shown in FIG. 1), where no subtitle timing information is acquired for the acquired content data item.

That is to say, at step S11, the content data acquisition unit 31 transmits data of a request for the content data to the recording-and-reproducing control unit 13 (shown in FIG. 1). In response to the request, the content data acquisition unit 31 acquires the content data which is reproduced from the recording medium 14 and transmitted to the content data acquisition unit 31 via the decoder 15 through the recording-and-reproducing control unit 13.

Further, the content data acquisition unit 31 transmits the content data acquired from the recording-and-reproducing control unit 13 via the decoder 15 to the subtitle acquisition unit 32 and the voice acquisition unit 34, and the processing advances from step S11 to step S12.

At step S12, the subtitle acquisition unit 32 acquires each of the subtitle data items from the content data transmitted from the content data acquisition unit 31, and transmits the subtitle data items to the word extraction unit 33 and the subtitle timing information generation unit 36. Further, at step S12, the subtitle acquisition unit 32 acquires information about the time when each of the subtitle data items that are acquired from the content data transmitted from the content data acquisition unit 31 is displayed from the above-described content data, and transmits the acquired display time information to the word extraction unit 33.

Further, at step S12, the voice acquisition unit 34 acquires voice data (data of the waveform of a voice) from the content data transmitted from the content data acquisition unit 31, and transmits the voice data to the voice search unit 35.

After that, the processing advances from step S12 to step S13 and the word extraction unit 33 extracts data of a search target word from each of the subtitle data items that are transmitted from the subtitle acquisition unit 32, as a character string targeted for a search. Further, the word extraction unit 33 generates data of a search target list with which the search target word extracted from each of the subtitle data items and the display time information transmitted from the subtitle acquisition unit 32 (the information about the time when subtitles from which the search target word is extracted are displayed) are registered in association with each other. Then, the word extraction unit 33 transmits the search target list data to the voice search unit 35 and the processing advances from step S13 to step S14.

Here, for example, the word extraction unit 33 performs the morphological analysis for text data functioning as the subtitle data so that the text data is divided into words and data of the reading (vocal sound) of each of the words is acquired. Further, the word extraction unit selects (extracts) a word with the longest reading, a proper noun, at least two continuous words (word string) having a predetermined number of characters or more, and so forth from words obtained by dividing text data, for example, as the search target word so as to search for data of a voice uttering a search target word which becomes a remarked word with appropriate precision, for example, at step S16 which will be described later.

At step S14, the voice search unit 35 determines whether or not the search target word is registered with the search target list data transmitted from the word extraction unit 33.

If it is determined that the search target word is registered with the search target list at step S14, the processing advances to step S15 and the voice search unit 35 selects one of the search target words that are registered with the search target list, as a remarked word.

After that, the processing advances from step S15 to step S16, and the voice search unit 35 searches the voice data transmitted from the voice acquisition unit 34 for data of a voice uttering the remarked word. Then, the voice search unit 35 recognizes the time when the remarked word is uttered in image data included in the content data acquired at the next previous step, that is, step S11 based on the search result. Further, the voice search unit 35 generates timing information indicating the time when the remarked word is uttered so that the timing information is acquired, and transmits the timing information to the subtitle timing information generation unit 36 so that the processing advances from step S16 to step S17.

Here, the voice search unit 35 searches for the data of the voice uttering the remarked word through, for example, so-called keyword spotting and/or the method of generating the phoneme of the voice data transmitted from the voice acquisition unit 34 and the phoneme position as indexes and searching for the system of a phoneme included in the remarked word based on the above-described indexes.

Further, the voice search unit 35 can search the search target list data transmitted from the word extraction unit 33 for the data of the voice uttering the remarked word within the confines of voice data near the display time indicated by display time information associated with the remarked word (for example, time that includes the display time indicated by the display time information and that is proportional to the length of reading of the remarked word).

At step S17, the subtitle timing information generation unit 36 determines each of the subtitle data items transmitted from the subtitle acquisition unit 32 to be subtitle identification information of the subtitle data item. Further, the subtitle timing information generation unit 36 generates subtitle timing information that includes the timing information indicating the time when the remarked word is uttered, the timing information being transmitted from the voice search unit 35, and the subtitle identification information of subtitle data from which the remarked word is extracted, where the timing information and the subtitle identification information are associated with each other.

Further, the subtitle timing information generation unit 36 stores content identification information of the content data acquired at the next previous step, that is, step S11 in association with the subtitle timing information generated for the remarked word, and the processing advances from step S17 to step S18.

At step S18, the voice search unit 35 removes the remarked word and the display time information associated with the remarked word from the search target list of which data is transmitted from the word extraction unit 33.

After that, the processing returns from step S18 to step S14 so that the processing from step S14 on down is repeated.

If it is determined that the search target word is not registered with the search target list at step S14, that is to say, if the subtitle timing information is generated for each of subtitle data items that are included in the content data acquired at the next previous step, that is, step S11, the subtitle information acquisition processing is finished.

[Description of Synchronization-and-Reproducing Processing]

Figure 4:
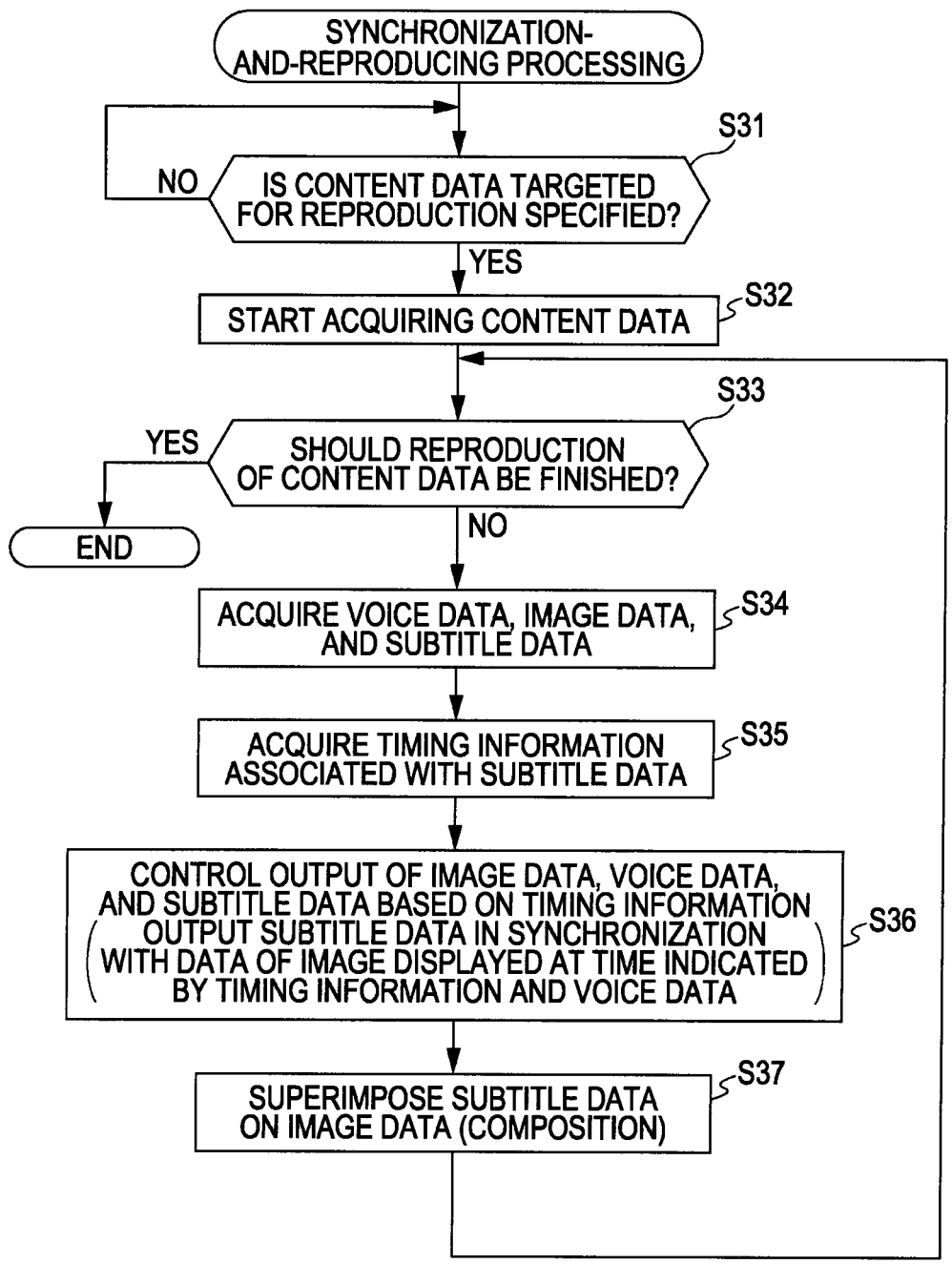
FIG. 4 is a flowchart illustrating synchronization-and-reproducing processing.

The synchronization-and-reproducing processing performed through the content data processing unit 16 shown in FIG. 2 will be described with reference to FIG. 4.

During the synchronization-and-reproducing processing, the content data acquisition unit 31 determines whether or not content data targeted for reproduction is specified by, for example, the user operating the recorder at step S31.

If it is determined that the content data targeted for reproduction is not specified at step S31, the processing returns to step S31.

If it is determined that the content data targeted for reproduction is specified at step S31, the processing advances to step S32 so that the content data acquisition unit 31 starts acquiring the content data and the processing advances to step S33.

That is to say, if the content data targeted for reproduction is specified by, for example, the user operating the recorder, the recording-and-reproducing control unit 13 (shown in FIG. 1) reproduces the content data for which the specification is made (hereinafter referred to as the specified content data) from the recording medium 14, and transmits the specified content data to the content data processing unit 16 via the decoder 15.

The content data acquisition unit 31 starts acquiring the specified content data which shall be transmitted to the content data processing unit 16 in the above-described manner.

The content data acquired through the content data acquisition unit 31 is transmitted to the voice acquisition unit 41, the image acquisition unit 42, and the subtitle acquisition unit 43 that are provided in the synchronization unit 40.

At step S33, the content data acquisition unit 31 determines whether or not the content data reproduction should be finished.

If it is determined that the content data reproduction should not be finished at step S33, that is to say, if the user does not perform an operation or the like instructing to finish the content data reproduction, the processing advances to step S34 so that voice data, image data, and subtitle data are acquired from the specified content data, and the processing advances to step S35.

That is to say, at step S34, the voice acquisition unit 41 acquires the voice data from the specified content data transmitted from the content data acquisition unit 31, and transmits the voice data to the output control unit 44.

Further, the image acquisition unit 42 acquires the image data from the specified content data transmitted from the content data acquisition unit 31, and transmits the image data to the output control unit 44.

Still further, the subtitle acquisition unit 43 acquires the subtitle data from the specified content data transmitted from the content data acquisition unit 31, and transmits the subtitle data to the output control unit 44.

Further, at step S35, the output control unit 44 refers to each of subtitle timing information items that are associated with the content identification information of the specified content data acquired through the content data acquisition unit 31 of the subtitle timing information stored in the subtitle timing information generation unit 36, as remarked subtitle timing information to be remarked.

Further, the output control unit 44 determines the subtitle data transmitted from the subtitle acquisition unit 43 to be the subtitle identification information, and detects timing information associated with the subtitle identification information from the remarked subtitle timing information so that the timing information is acquired.

Then, the processing advances from step S35 to step S36 so that the output control unit 44 controls the voice data output from the voice acquisition unit 41, the image data output from the image acquisition unit 42, and the subtitle data output from the subtitle acquisition unit 43 based on the subtitle timing information acquired from the remarked subtitle timing information.

That is to say, the output control unit 44 delays and/or does not delay the image data transmitted from the image acquisition unit 42 and voice data coming with the image data, the voice data being transmitted from the voice acquisition unit 41, as appropriate, and outputs the image data and the voice data.

Further, the output control unit 44 outputs the subtitle data transmitted from the subtitle acquisition unit 43 in synchronization with image data displayed at time indicated by the subtitle timing information acquired from the remarked subtitle timing information, that is, image data of which details are described by the subtitles corresponding to the subtitle data transmitted from the subtitle acquisition unit 43. That is to say, the output control unit 44 starts outputting the subtitle data transmitted from the subtitle acquisition unit 43 at the same time as when the image data of the time indicated by the subtitle timing information acquired from the remarked subtitle timing information is output.

The image data and the subtitle data (describing the details of the image data) that are output from the output control unit 44 are transmitted to the composition unit 45.

After that, the processing advances from step S36 to step S37 so that the composition unit 45 superimposes the subtitle data transmitted from the output control unit 44 on the image data which is also transmitted from the output control unit 44 (composition) so that composite image data is generated and output.

The composite image data output from the composition unit 45 is transmitted to the monitor (not shown) in addition to voice data coming with the composite image data, the voice data being output from the output control unit 44.

Consequently, the composite image corresponding to the composite image data, that is, a program image on which subtitles describing the program image is superimposed is displayed and the voice corresponding to the voice data is output through the monitor.

After that, the processing returns from step S37 to step S33 so that the processing from step S33 on down is repeated.

Then, if it is determined that the content data reproduction should be finished at step S33, that is to say, if the user performs an operation or the like instructing to finish the content data reproduction, the synchronization-and-reproducing processing is finished.

Thus, during the subtitle timing information acquisition processing (shown in FIG. 3) performed in the content data processing unit 16, the word extraction unit 33 extracts the search target word as a character string targeted for a search from the subtitle data included in the content data including the image data, the voice data, and the subtitle data, the voice search unit 35 searches the voice data included in the content data for the data of voice uttering the search target word so that timing information indicating the time when the search target word is uttered in the image data is acquired, and the subtitle timing information generation unit 36 generates the subtitle timing information including the subtitle identification information provided to identify subtitle data including the search target word and the timing information indicating the time when the search target word is uttered, where the subtitle identification information and the timing information are associated with each other.

Further, during the synchronization-and-reproducing processing (shown in FIG. 4) performed in the content data processing unit 16, the output control unit 44 synchronizes the subtitle data and image data of the time indicated by the timing information associated with the subtitle identification information of the subtitle data based on the subtitle timing information, and outputs the subtitle data and the image data.

Therefore, the image and subtitles of the contents can be synchronized and displayed with facility. That is to say, it becomes possible to display the content image on which subtitles describing the details of the content image are superimposed without modifying the broadcast standard and/or making the broadcast station be ready for the broadcast standard, for example.

As a result, it becomes possible to reduce subtitles displayed out of synchronization with the image of which details are described through the subtitles, and prevent the audience from being confused and/or annoyed.

Further, the word extraction unit 33 can adopt a plurality of word strings including a clause, a sentence, etc. in addition to a single word as a character string targeted for a search, the character string being extracted from the subtitle data.

Further, in the above-described embodiment, the content data processing unit 16 generates the subtitle timing information based on the content data recorded on the recording medium 14 so that the subtitle timing information is acquired. However, the subtitle timing information may be acquired from a server or the like provided on the Internet, for example. Namely, the subtitle timing information may be generated and presented through the server provided on the Internet. In that case, the content data processing unit 16 may download the subtitle timing information from the server provided on the Internet for acquisition.

When downloading the subtitle timing information from the server provided on the Internet for acquisition, the content data processing unit 16 may not include the subtitle acquisition unit 32 provided as a block configured to generate the subtitle timing information, the word extraction unit 33, the voice acquisition unit 34, the voice search unit 35, and the subtitle timing information generation unit 36.

Further, in the above-described embodiment, the subtitle timing information acquisition processing (shown in FIG. 3) and the synchronization-and-reproducing processing (shown in FIG. 4) are performed for the content data stored (recorded) in the recording medium 14. However, the subtitle timing information acquisition processing and the synchronization-and-reproducing processing may be performed for the content data of a program broadcasted in real time in addition to the content data recorded on the recording medium 14.

When the subtitle timing information acquisition processing and the synchronization-and-reproducing processing are performed for the content data of the program broadcasted in real time, the content data is transmitted to the subtitle acquisition unit 32 and the voice acquisition unit 34, and the voice acquisition unit 41, the image acquisition unit 42, and the subtitle acquisition unit 43 that are provided in the synchronization unit 40, and the subtitle timing information acquisition processing (shown in FIG. 3) and the synchronization-and-reproducing processing (shown in FIG. 4) are performed in parallel with each other in the content data processing unit 16.

In that case, the output control unit 44 (shown in FIG. 2) delays the voice data transmitted from the voice acquisition unit 41 and the image data transmitted from the image acquisition unit 42 by as much as a predetermined time such as a time taken for acquiring the subtitle timing information for at least one subtitle data item (a group of subtitle data items), and outputs the voice data and the image data as the synchronization-and-reproducing processing.

On the other hand, the subtitle acquisition unit 32, the word extraction unit 33, the voice acquisition unit 34, the voice search unit 35, and the subtitle timing information generation unit 36 generate the subtitle timing information for the latest subtitle data acquired through the subtitle acquisition unit 32 as the subtitle timing information acquisition processing, and transmits the subtitle timing information to the output control unit 44.

The output control unit 44 outputs the latest subtitle data transmitted from the subtitle acquisition unit 43 in synchronization with the corresponding image data based on the latest subtitle timing information.

In the above-described embodiment, the present invention is used for the recorder. However, in addition to the recorder, the present invention can be used for a device and/or an apparatus configured to reproduce contents, such as a television (TV) configured to receive a television broadcast program.

Next, the above-described series of processing procedures performed through the content data processing unit 16 may be performed through hardware and/or software. When the series of processing procedures is performed through the software, a program included in the software is installed on a general-purpose computer, for example.

Figure 5:
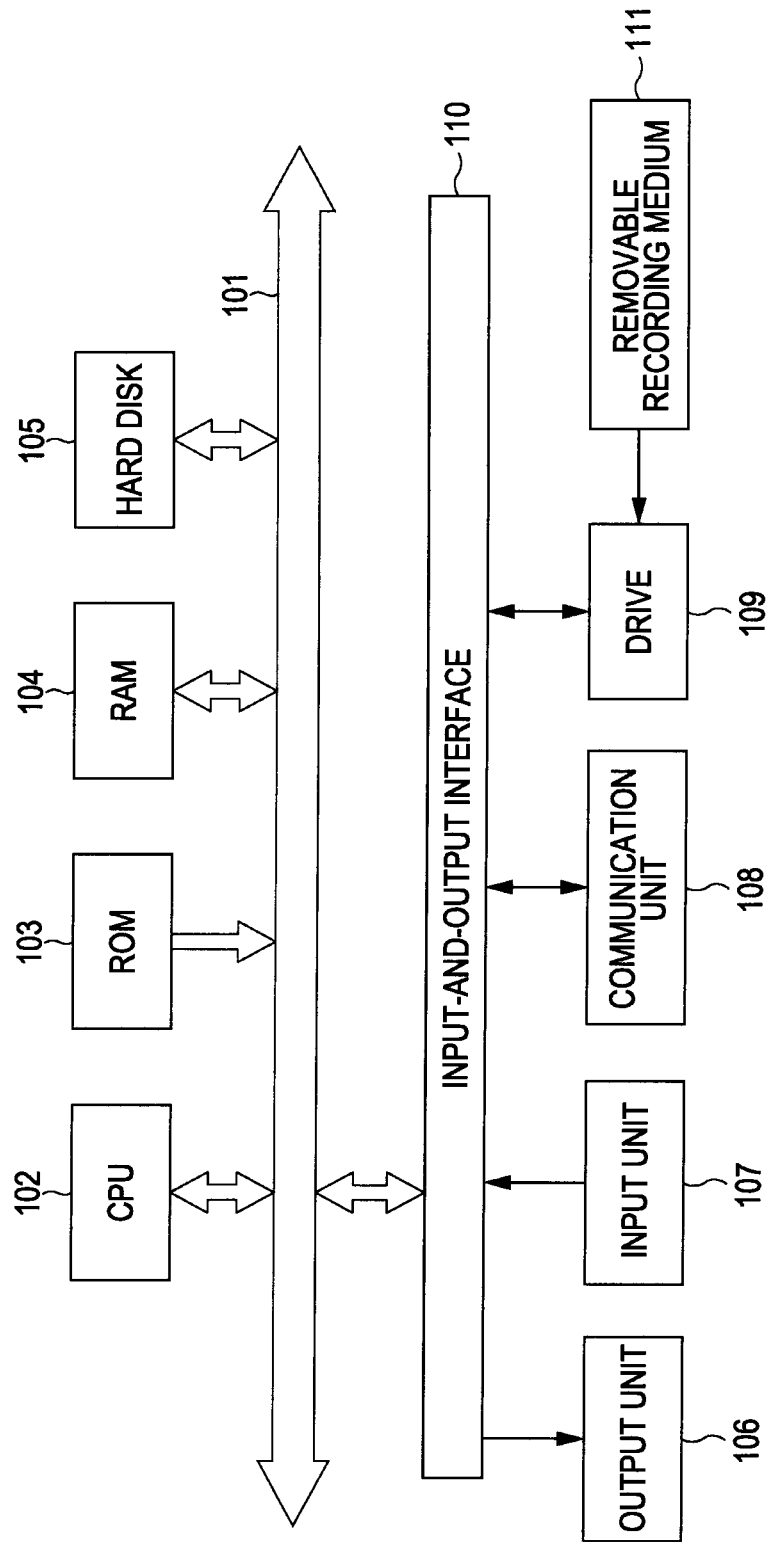
FIG. 5 is a block diagram showing an exemplary configuration of a computer according to an embodiment of the present invention.

FIG. 5 shows an exemplary configuration of a computer according to an embodiment of the present invention, where a program executing the above-described series of processing procedures is installed on the computer.

The program may be recorded, in advance, on a hard disk 105 and/or a read only memory (ROM) 103 functioning as a recording medium provided in the computer.

Otherwise, the program may be stored (recorded) in a removable recording medium 111 temporarily and/or permanently, where the removable recording medium 111 includes a flexible disk, a compact disk read only memory (CD-ROM), a magneto-optical (MO) disk, a digital versatile disk (DVD), a magnetic disk, a semiconductor memory, and so forth. The above-described removable recording medium 111 may be presented as so-called packaged software.

In addition to being installed from the above-described removable recording medium 111 on the computer, the program may be wirelessly transferred from a download site to the computer via an artificial satellite provided to achieve a digital satellite broadcast, or wire-transferred to the computer via a network including a local area network (LAN), the Internet, and so forth. The computer can receive the program transferred in the above-described manner through a communication unit 108 and install the program on an internal hard disk 105.

The computer includes a central processing unit (CPU) 102 connected to an input-and-output interface 110 via a bus 101. When an input unit 107 including a keyboard, a mouse, a microphone, and so forth is operated by the user, for example, so that an instruction is transmitted to the CPU 102 via the input-and-output interface 110, the CPU 102 executes a program stored in a read only memory (ROM) 103 based on the instruction. On the other hand, the CPU 102 loads a program stored in the hard disk 105, a program which is transferred from a satellite and/or a network, received by the communication unit 108, and installed on the hard disk 105, or a program that is read from the removable recording medium 111 inserted into a drive 109 and that is installed on the hard disk 105 into a random access memory (RAM) 104 and executes the program. Consequently, the CPU 102 performs processing based on the above-described flowcharts and processing performed through the configurations of the above-described block diagrams. Then, the CPU 102 outputs data of the processing result from the output unit 106 including a liquid crystal display (LCD), a speaker, and so forth via the input-and-output interface 110, for example, or transmits the processing result data from the communication unit 108, and records the processing result data on the hard disk 105, as appropriate.

Further, in this specification, processing steps describing a program making a computer execute various processing procedures may not be performed in time sequence according to order written as the flowcharts. Namely, the processing steps include processing procedures executed in parallel and/or separately (e.g., parallel processing and/or processing executed by an object).

The program may be processed through a single computer or distributed among a plurality of computers for processing. Further, the program may be transferred to a distant computer and executed.

The present application contains subject matter related to that disclosed in Japanese Priority Patent Application JP 2008-309578 filed in the Japan Patent Office on Dec. 4, 2008, the entire content of which is hereby incorporated by reference.

It should be understood by those skilled in the art that, without being limited to the above-described embodiments, various modifications, combinations, sub-combinations and alterations may occur depending on design requirements and other factors insofar as they are within the scope of the appended claims or the equivalents thereof.

What is claimed is:

1. A data processing device comprising a physical processor and a memory storing instructions, the physical processor executing the instructions to:
   extract a character string from subtitle data of content data, the content data including image data, voice data, and the subtitle data, in which the subtitle data does not synchronize with the image data;
   acquire display time information indicating a display time when the character string is displayed;
   conduct a search, within confines of voice data near the display time and less than the entire segment of the voice data, for voice data of a voice uttering the character string;
   acquire timing information indicating a time when the character string is uttered based on a result of the search, the timing information being included in the image data;
   generate subtitle timing information including identification information provided to identify the subtitle data including the character string and the timing information, by associating the identification information and the timing information with each other;
   synchronize the subtitle data and image data of the time indicated by timing information associated with identification information of the subtitle data; and
   output the synchronized subtitle data and the image data.

2. A data processing method comprising the steps of:
   extracting a character string from subtitle data of content data, the content data including image data, voice data, and the subtitle data, in which the subtitle data does not synchronize with the image data;
   acquiring display time information indicating a display time when the character string is displayed;

conducting a search, within confines of voice data near the display time and less than the entire segment of the voice data, for voice data of a voice uttering the character string;

acquiring timing information indicating a time when the character string is uttered based on a result of the search, the timing information being included in the image data;

generating subtitle timing information including identification information provided to identify the subtitle data including the character string and the timing information, by associating the identification information and the timing information with each other;

synchronizing the subtitle data and image data of the time indicated by timing information associated with identification information of the subtitle data; and outputting the synchronized subtitle data and the image data through a data processing device.

3. A non-transitory computer-readable medium storing a program which, when executed by a computer, causes the computer to:

extract a character string from subtitle data of content data, the content data including image data, voice data, and the subtitle data, in which the subtitle data does not synchronize with the image data;

acquire display time information indicating a display time when the character string is displayed;

conduct a search, within confines of voice data near the display time and less than the entire segment of the voice data, for voice data of a voice uttering the character string;

acquire timing information indicating a time when the character string is uttered based on a result of the search, the timing information being included in the image data;

generate subtitle timing information including identification information provided to identify the subtitle data including the character string and the timing information, by associating the identification information and the timing information with each other;

synchronize the subtitle data and image data of the time indicated by timing information associated with identification information of the subtitle data; and output the synchronized subtitle data and the image data.

4. A data processing device comprising:

an output control unit configured to extract a character string from subtitle data of content data, the content data including image data, voice data, and the subtitle data, in which the subtitle data does not synchronize with the image data; and acquire display time information indicating a display time when the character string is displayed;

a search unit configured to conduct a search, within confines of voice data near the display time and less than the entire segment of the voice data, for voice data of a voice uttering the character string;

a processing unit configured to acquire timing information indicating a time when the character string is uttered based on a result of the search, the timing information being included in the image data;

a generation unit configured to generate subtitle timing information including identification information provided to identify the subtitle data including the character string and the timing information, by associating the identification information and the timing information with each other;

a synchronization unit configured to synchronize the subtitle data and image data of the time indicated by timing information associated with identification information of the subtitle data; and an output unit configured to output the synchronized subtitle data and the image data.

5. The data processing device according to claim 1, wherein the physical processor executes the instructions to extract the character string by a morphological analysis method.

6. The data processing device according to claim 1, further comprising:

a receiver configured to receive the content data from a broadcasting device.

7. The method according to claim 2, wherein the extraction of the character string is conducted by a morphological analysis method.

8. The method according to claim 2, further comprising:

receiving the content data from a broadcasting device.

9. The non-transitory computer-readable medium according to claim 3, wherein the program further causes the computer to extract the character string by a morphological analysis method.

10. The non-transitory computer-readable medium according to claim 3, wherein the program further causes the computer to receive the content data from a broadcasting device.

11. The data processing device according to claim 4, wherein the output control unit extracts the character string by a morphological analysis method.

12. The data processing device according to claim 4, further comprising:

a receiver configured to receive the content data from a broadcasting device.

* * * * *